United States Patent
Imaida

(10) Patent No.: US 8,520,139 B2
(45) Date of Patent: Aug. 27, 2013

(54) DEVICE AND METHOD FOR CONTROLLING FRAME RATE, RECORDING APPARATUS AND IMAGE PICKUP APPARATUS

(75) Inventor: Hideyuki Imaida, Tokyo (JP)

(73) Assignee: Sony Corporation, Tokyo (JP)

( * ) Notice: Subject to any disclaimer, the term of this patent is extended or adjusted under 35 U.S.C. 154(b) by 1019 days.

(21) Appl. No.: 12/011,745

(22) Filed: Jan. 29, 2008

(65) Prior Publication Data

US 2008/0180569 A1    Jul. 31, 2008

(30) Foreign Application Priority Data

Jan. 31, 2007  (JP) .............................. P2007-021782

(51) Int. Cl.
*H04N 7/01*    (2006.01)
(52) U.S. Cl.
USPC ........................................................ 348/441
(58) Field of Classification Search
USPC .......................................................... 348/469
See application file for complete search history.

(56) References Cited

U.S. PATENT DOCUMENTS

| | | | |
|---|---|---|---|
| 6,542,195 B1* | 4/2003 | Asahara et al. | 348/441 |
| 2005/0036055 A1* | 2/2005 | Nakasuji et al. | 348/333.12 |
| 2005/0163492 A1* | 7/2005 | Ueda et al. | 386/109 |
| 2006/0238620 A1* | 10/2006 | Asada et al. | 348/207.99 |

FOREIGN PATENT DOCUMENTS

| | | |
|---|---|---|
| CN | 1738482 | 2/2006 |
| CN | 1762151 | 4/2006 |
| JP | 9 168148 | 6/1997 |
| JP | 2000 125210 | 4/2000 |
| JP | 2004-96136 | 3/2004 |
| JP | 2006 352227 | 12/2006 |
| JP | 2006 352529 | 12/2006 |
| JP | 2008-99110 | 4/2008 |
| WO | WO 03/063471 | 7/2003 |

\* cited by examiner

*Primary Examiner* — Vivek Srivastava
*Assistant Examiner* — Alfonso Castro
(74) *Attorney, Agent, or Firm* — Frommer Lawrence & Haug LLP; William S. Frommer

(57) ABSTRACT

A device for controlling frame rate of an image signal on a motion image is provided. The device contains a manipulation portion that a user manipulates to select a desired variation of the frame rate change over time from plural variations thereof, and a control portion that controls generation of a frame rate control signal for bring the frame rate automatically to the variation of the frame rate change selected by the manipulation portion.

7 Claims, 12 Drawing Sheets

| INDICATED FRAME RATES FRs | NUMBERS OF FRAME(S) TO BE ADDED UP FA | IMAGE-PICKUP FRAME RATES FRp=FRs×FA |
|---|---|---|
| 60P≧FRs>30P | 1 | 60P≧FRp>30P |
| 30P≧FRs>20P | 2 | 60P≧FRp>40P |
| 20P≧FRs>15P | 3 | 60P≧FRp>45P |
| 15P≧FRs>12P | 4 | 60P≧FRp>48P |
| 12P≧FRs>10P | 5 | 60P≧FRp>50P |
| 10P≧FRs>6P | 6 | 60P≧FRp>36P |
| 6P≧FRs>5P | 10 | 60P≧FRp>50P |
| 5P≧FRs>4P | 12 | 60P≧FRp>48P |
| 4P≧FRs>3P | 15 | 60P≧FRp>45P |
| 3P≧FRs>2P | 20 | 60P≧FRp>40P |
| 2P≧FRs>1P | 30 | 60P≧FRp>30P |
| 1P | 60 | 60P |

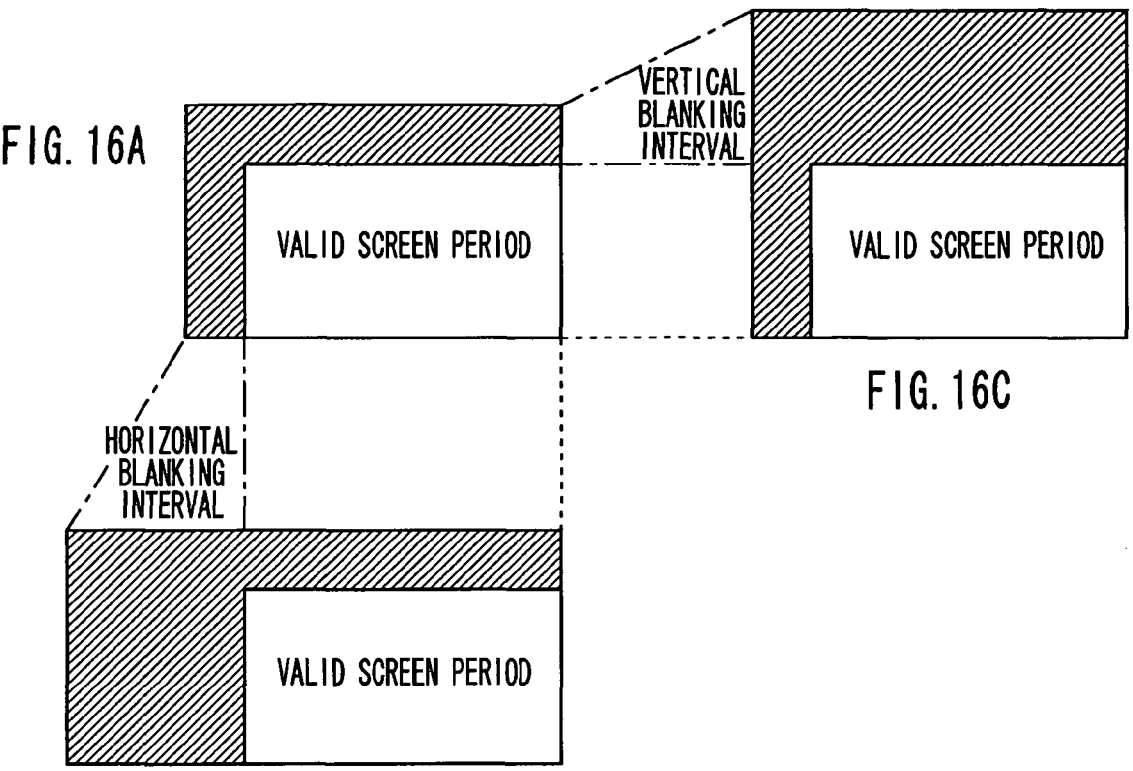

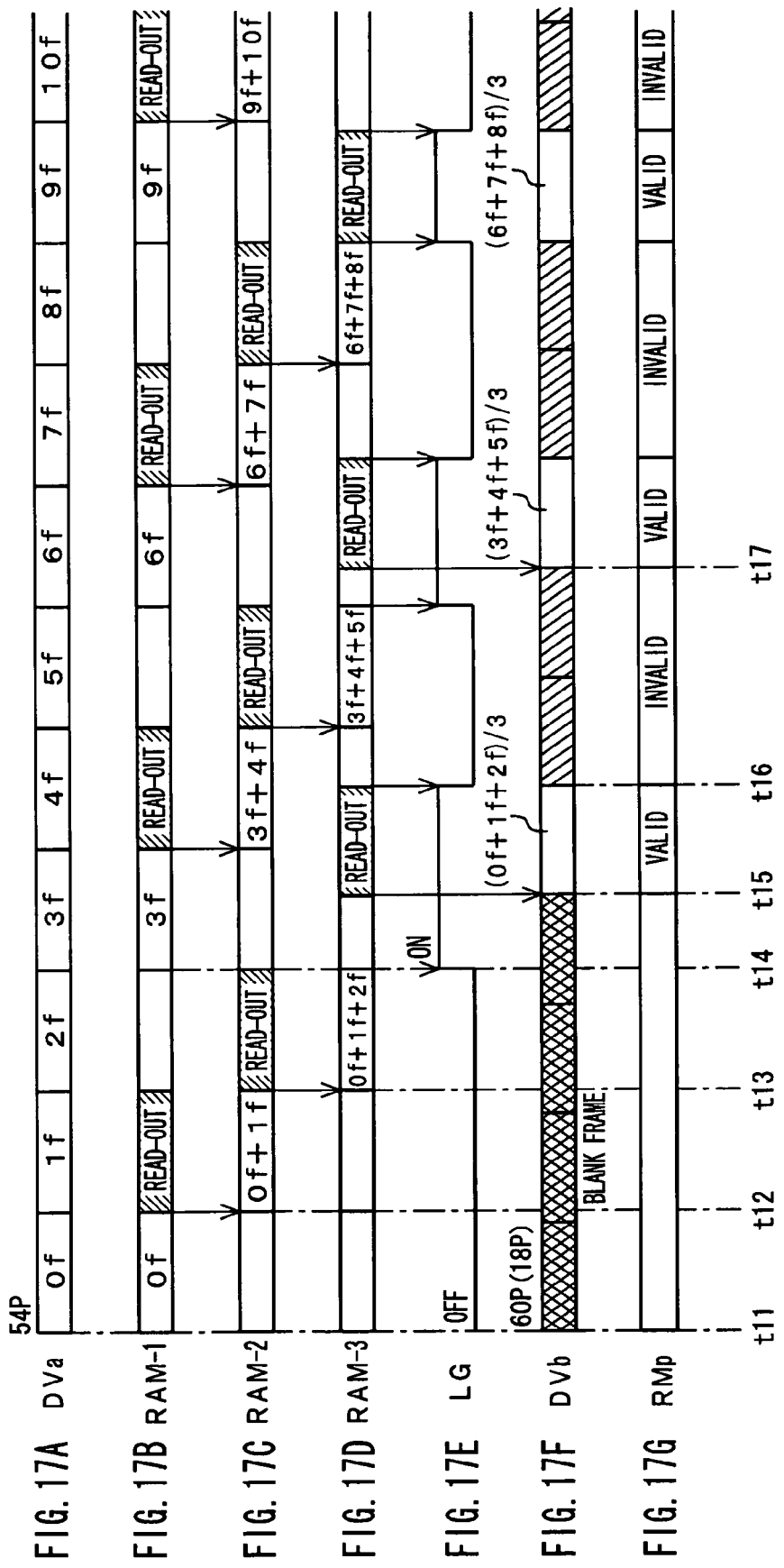

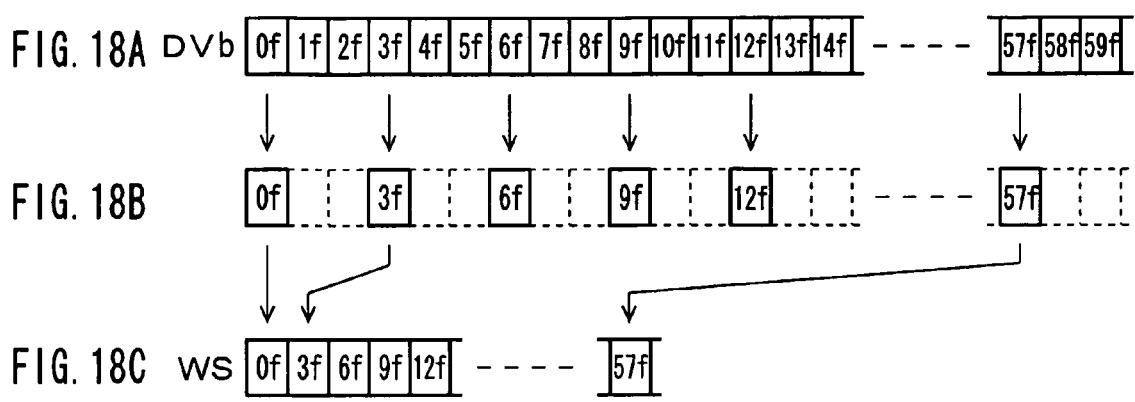

DEVICE AND METHOD FOR CONTROLLING FRAME RATE, RECORDING APPARATUS AND IMAGE PICKUP APPARATUS

CROSS-REFERENCES TO RELATED APPLICATIONS

The present invention contains subject matters related to Japanese Patent Application JP 2007-21782 filed in the Japanese Patent Office on Jan. 31, 2007, the entire contents of which being incorporated herein by reference.

BACKGROUND OF THE INVENTION

1. Field of the Invention

The present invention relates to a device and a method for controlling frame rate, a recording apparatus and an image pickup apparatus, which are used for filmmaking and/or television program making.

2. Description of Related Art

In the movie productions, the television program productions and the like, an image pickup apparatus, a recording apparatus and the like have previously provided with any functions for changing a frame rate in order to enhance their special image effects. For example, Japanese Patent Application Publication No. 2000-125210 has disclosed an image pickup apparatus in which a scene is shot at higher frame rate than its normal frame rate and a reproduction thereof is executed at the normal frame rate, thereby enabling the scene to be slowly reproduced. Accordingly, a user can see a high speed scene such that a water droplet falls into a surface of water with ease and in detail. Contrary, a scene is shot at lower frame rate than its normal frame rate and a reproduction thereof is executed at the normal frame rate, thereby enabling the scene to be fast reproduced. Accordingly, a user can present any scene such as a fight scene and a car chase scene filled with a feeling of speed by which the user strongly feels as if he or she were there.

Japanese Patent Application Publication No. H09-168148 has disclosed that a frame rate varies by using 3:2 pull-down processing.

SUMMARY OF THE INVENTION

In the frame rate changes, in general, the frame rate varies linearly when the frame rate automatically changes from its first frame rate, "Rst" to its last frame rate, "Red". By, however, using only the linear variation on frame rate changes, it is difficult to satisfy various kinds of any requirements for image presentation by the user.

In view of this, it is desirable to provide a device and a method for controlling frame rate, a recording apparatus and an image pickup apparatus, by which the user can realize various kinds of variations on frame rate changes easily.

According to an embodiment of the present invention, there is provided a device for controlling frame rate of an image signal on a motion image. The device contains a manipulation portion that a user manipulates to select a desired variation of the frame rate change over time from plural variations thereof, and a control portion that controls generation of a frame rate control signal for bring the frame rate automatically to the variation of the frame rate change selected by the manipulation portion.

According to another embodiment of the present invention, there is provided a method for a method for controlling frame rate of an image signal on a motion image. The method contains the steps of selecting a desired variation of the frame rate change over time from plural variations thereof based on a user's manipulation, and generating a frame rate control signal for bring the frame rate automatically to the selected variation of the frame rate change.

According to further embodiment of the present invention, there is provided a recording apparatus. The recording apparatus contains a record-processing portion that records an image signal on a motion image on a recording medium, a manipulation portion that a user manipulates to select a desired variation of the frame rate change over time from plural variations thereof, a control portion that controls generation of a frame rate control signal for bring the frame rate automatically to the variation of the frame rate change selected by the manipulation portion, and a record-managing portion that manages the record-processing portion based on the frame rate control signal to enable the record-processing portion to record the image signal on the motion image on the recording medium by changing the frame rate of the image signal on the motion image to the variation of the frame rate change selected by the manipulation portion.

According to additional embodiment of the present invention, there is provided an image pickup apparatus. The image pickup apparatus contains an image pickup portion that generates an image pickup signal, a frame-addition portion that adds up the image pickup signal in frame units to generate an image signal, a manipulation portion that a user manipulates to select a desired variation of the frame rate change over time from plural variations thereof, a control portion that controls generation of a frame rate control signal for bring the frame rate automatically to the variation of the frame rate change selected by the manipulation portion, and an image-pickup-managing portion that manages any one of the frame rate of the image pickup signal generated by the image pickup portion and a number of frame that is added up in the frame-addition portion, based on the frame rate control signal, to bring a frame rate of the image signal to the variation on frame rate change selected by the manipulation portion.

In these embodiments of the invention, a desired variation of the frame rate change over time can be selected from plural variations thereof. The plural variations include a variation of frame rate change in which frame rate varies linearly, a variation of frame rate change in which a number of frame is constant in each value of the frame rate when the frame rate varies with a period of time being elapsed, and a variation of frame rate change in which the frame rate varies on the basis of information on frame rate change, for example, information indicating the transit point(s) when the frame rate varies. When any one of the variations is selected, the frame rate control signal for bring the frame rate automatically to the selected variation is generated, so that the frame rate of the image signal on an motion image to be generated and/or to be recorded can vary based on the frame rate control signal.

According to the embodiments of the present invention, by controlling the frame rates of the image signal on the motion image to be generated in the image pickup apparatus or to be recorded in the recording apparatus, a desired variation of the frame rate change over time can be selected from the plural variations thereof, and the frame rate control signal for bring the frame rate automatically to the selected variation of the frame rate change can be generated.

Thus, it is possible to realize various kinds of the variations of frame rate changes on the image signal relative to the motion image, thereby enabling various kinds of any requirements for image presentation by the user to be satisfied.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 15 is a table for showing a relationship between numbers of frames to be added and frame rates of an image-taken image with respect to indicated frame rates;

FIGS. 16A through 16C are explanatory diagrams each for explaining a common data rate (CDR) system;

FIGS. 17A through 17G are diagrams for showing operations in the case of generating an image signal and communication information; and FIGS. 18A through 18C are diagrams each for showing a recording operation using thinning-out of frames.

DESCRIPTION OF THE PREFERRED EMBODIMENTS

Figure 1:
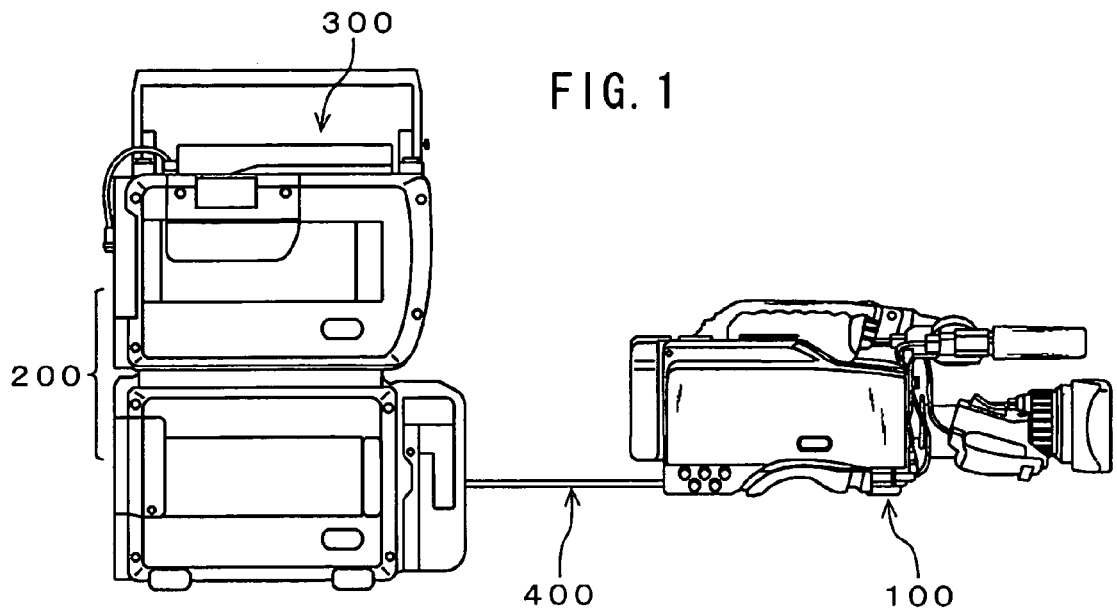
FIG. 1 is a diagram for illustrating a configuration of a system using embodiments of a recording apparatus and an image pickup apparatus to which the invention is applied.

The following will describe preferred embodiments of a device and a method for controlling frame rate, a recording apparatus and an image pickup apparatus according to the present invention with reference to drawings. FIG. 1 illustrates a configuration of a system using embodiments of a recording apparatus and an image pickup apparatus to which the invention is applied, in which the device for controlling the frame rate controls frame rates for the recording apparatus or the image pickup apparatus.

In FIG. 1, an image pickup apparatus 100 generates an image signal having a constant frame rate or a desired frame rate. A recording apparatus 200 records on recording medium a signal having a desired frame rate, which is obtained by thinning the frame(s) out of the image signal having the constant frame rate, adding the frames to the image signal having the constant frame rate, or repeating a frame to add the repeated frames to the image signal having the constant frame rate. Alternatively, the recording apparatus 200 records on recording medium an image signal having a changed frame rate. Further, if a frame rate is set to a predetermined frame rate when transmitting an image signal in a transmission path 400 that is connected with the image pickup apparatus 100 and the recording apparatus 200, the image pickup apparatus 100 changes the generated image signal having the desired frame rate to the image signal having a frame rate set in the transmission path 400 to output it. The recording apparatus 200 records on recording medium a signal having the desired frame rate, which is obtained by thinning the frame(s) out of the image signal received through the transmission path 400, or repeating the frame.

The device for controlling frame rate sets frame rate of the image signal to be generated in the image pickup apparatus 100 or frame rate of the image signal to be recorded in the recording apparatus 200.

It is to be noted that although the system in which the recording apparatus 200 is connected to the image pickup apparatus 100 and records the image signal generated in the image pickup apparatus 100 has been shown in FIG. 1, the system may contain the device for controlling frame rate and the image pickup apparatus 100, by which the image pickup apparatus 100 outputs an image signal having a frame rate indicated by the device for controlling frame rate. Further, the system may contain the device for controlling frame rate and the recording apparatus 200, by which the recording apparatus 200 records an image signal having a frame rate indicated by the device for controlling frame rate. Additionally, the device for controlling frame rate may be separately provided from the image pickup apparatus 100 or the recording apparatus 200. The image pickup apparatus 100 or the recording apparatus 200 may include any functions of the device for controlling frame rate.

Figure 2:
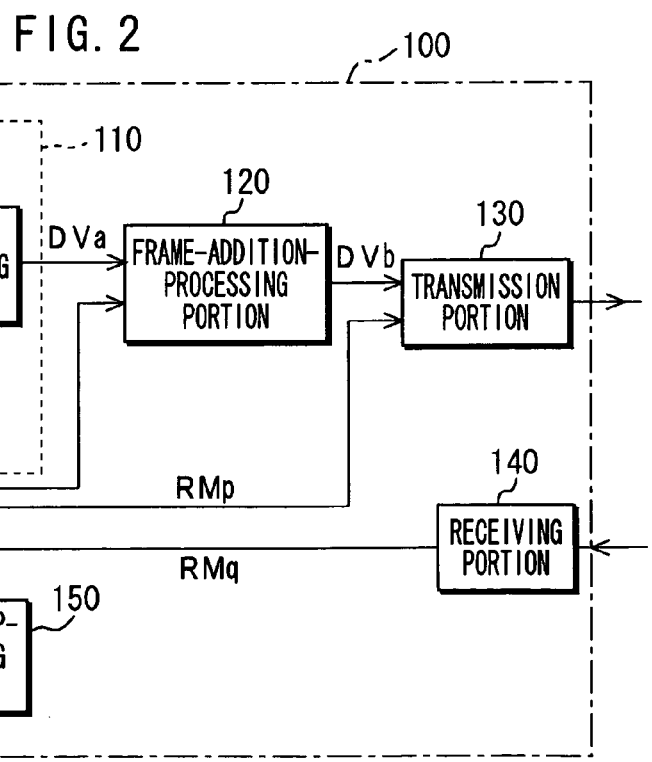
FIG. 2 is a block diagram for illustrating a configuration of an embodiment of the image pickup apparatus according to the invention.

FIG. 2 illustrates a configuration of an embodiment of the image pickup apparatus 100 according to the invention. The image pickup apparatus 100 forms a subject image based on light that is incident from an image pickup lens, not shown, on an imaging area of an image pickup device, not shown, constituting an image pickup unit 111 in an image-signal-generating portion 110. The image pickup device generates any imaged charges of the subject image by photoelectric conversion and reads the imaged charges out thereof based on a driving control signal RC received from the driving unit 112 to convert it to an electric voltage signal. The image pickup unit 111 supplies this electric voltage signal as an image pickup signal Spa to an image-pickup-signal-processing unit 113.

The driving unit 112 generates the driving control signal RC based on an image pickup control signal CTa received from an image-pickup-controlling portion 150, which will be described later, and supplies it to the image pickup unit 111. Based on the image pickup control signal CTa, the driving unit 112 also adjusts timing or the like of the driving control signal RC to change frame rate of the image pickup signal Spa.

The image-pickup-signal-processing unit 113 reduces any noise components after the image pickup signal Spa has been amplified. The image-pickup-signal-processing unit 113 converts the noise-reduced image signal to a digital signal and then, it performs any feed-back clamp processing, any correction processing such as any flare correction or any correction for any defection of the image pickup device, any process control, and the like on the converted digital signal to generate an image signal DVa. The image-pickup-signal-processing unit 113 supplies a frame-addition-processing portion 120 with this image signal DVa.

The frame-addition-processing portion 120 performs any frame-addition processing on the image signal DVa to change a frame rate of the image signal DVa and generates an image signal DVb having a changed frame rate. For example, a random access memory (RAM) may be used to carry out such the frame addition processing.

It is to be noted that the image pickup control signal CTa from the image-pickup-controlling portion 150 is used for controlling signal-processing operations in the image-pickup-signal-processing unit 113 and a number of frames to be added up during the frame addition processing performed by the frame-addition-processing portion 120.

A transmission portion 130 is connected to a receiving portion 210 of the recording apparatus 200 through the transmission path 400 and supplies the recording apparatus 200 with the image signal DVb and communication information RMp that has been received from the image-pickup-controlling portion 150.

A receiving portion 140 is connected to a transmission portion 270 of the recording apparatus 200 through the transmission path 400 and supplies the image-pickup-controlling portion 150 with communication information RMq that has been received from the recording apparatus 200.

A user interface portion 160 is connected to the image-pickup-controlling portion 150. When the image-pickup-controlling portion 150 receives an operation signal PSa corresponding to any user's manipulations through the user interface portion 160, the image-pickup-controlling portion 150 generates the image pickup control signal CTa based on this operation signal PSa to control operations of various parts, thereby enabling the image pickup apparatus 100 to operate corresponding to the user's manipulations.

When image-pickup-controlling portion 150 receives a frame rate control signal CTfs for indicating a frame rate of the image signal DVb output from the frame-addition-processing portion 120 as the communication information RMq, the image-pickup-controlling portion 150 generates the image pickup control signal CTa based on the frame rate control signal CTfs to change the frame rate of the image signal DVb.

It is to be noted that the image pickup apparatus 100 is provided with an electronic view finder, not shown, by which the user can view an image while he or she shoots it or it is reproduced in the recording apparatus 200.

Figure 3:
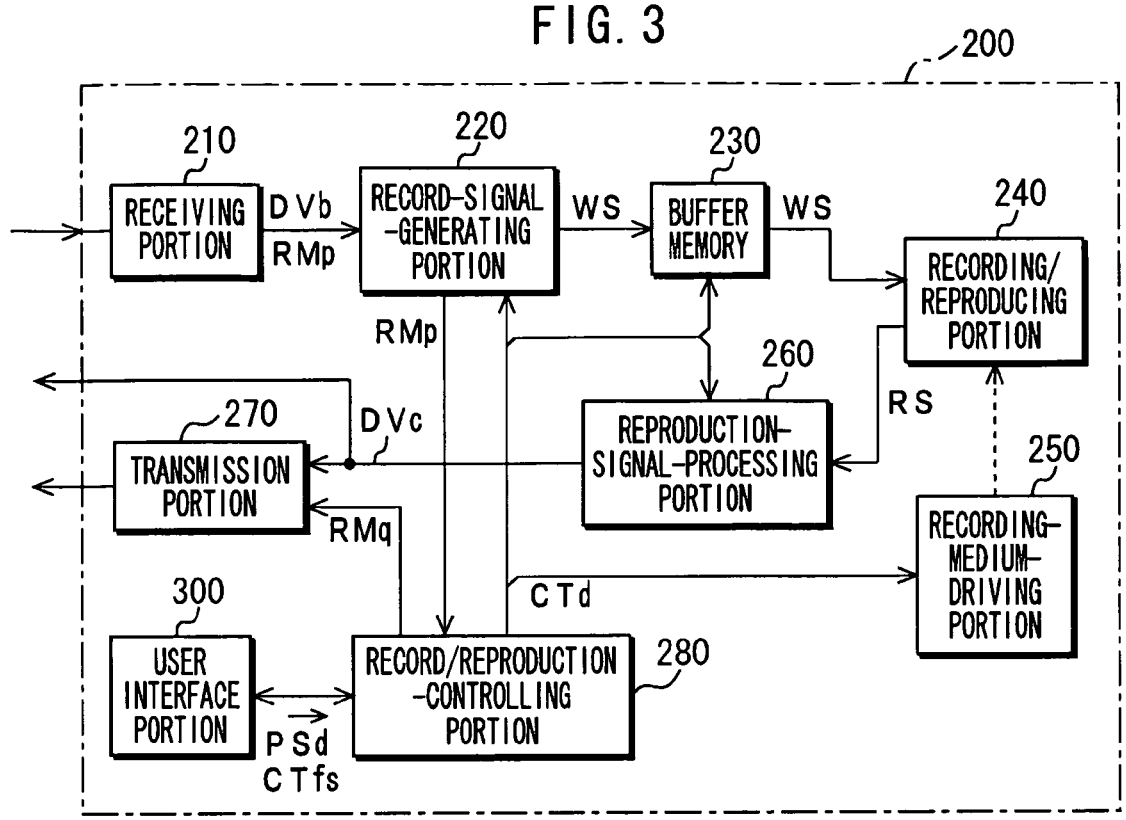
FIG. 3 is a block diagram for illustrating a configuration of an embodiment of the recording apparatus according to the invention.

FIG. 3 illustrates a configuration of an embodiment of the recording apparatus 200 according to the invention. The receiving portion 210 receives the image signal DVb and supplies it to the record-signal-generating portion 220. The receiving portion 210 also receives the communication information RMp and supplies it to a record/reproduction-controlling portion 280 through the record-signal-generating portion 220.

The record-signal-generating portion 220 performs any compression processing, any modulation processing, any addition processing of error correction codes, and the like on the received image signal DVb to generate a record signal WS that is then supplied to a buffer memory 230. To the buffer memory 230, a recording/reproducing portion 240 is connected. The recording/reproducing portion 240 records the record signal WS on a recording medium such as a magnetic tape, a magnetic disk, an optical disk, a semiconductor memory or the like with the record signal WS being read out of the buffer memory 230 successively. It is to be noted that if the magnetic tape, the magnetic disk or the optical disk is used as the recording medium, a recording medium-driving portion 250 for driving the recording medium may be provided. The recording/reproducing portion 240 also reads a read signal RS out of the recording medium and supplies the read signal RS to a reproduction-signal-processing portion 260.

The reproduction-signal-processing portion 260 performs any error correction processing, any demodulation processing, and any expansion processing on the read signal RS to generate an image signal DVc. It is to be noted that if the image pickup apparatus 100 monitors the images recorded on the recording medium, the reproduction-signal-processing portion 260 supplies the image signal DVc to the transmission portion 270.

The transmission portion 270 is connected to the receiving portion 140 of the image pickup apparatus 100 through the transmission path 400 and supplies the image pickup apparatus 100 with the communication information RMq that has been received from the record/reproduction-controlling portion 280, which will be described later. When receiving the image signal DVc, the transmission portion 270 supplies the image pickup apparatus 100 with the image signal DVc.

A user interface portion 300 is connected to the record/reproduction-controlling portion 280. When the record/reproduction-controlling portion 280 receives an operation signal PSd corresponding to any user's manipulations through the user interface portion 300, the record/reproduction-controlling portion 280 generates a record/reproduction control signal CTd based on this operation signal PSd to supply it to various parts, thereby enabling the recording apparatus 200 to operate corresponding to the user's manipulations.

The user interface portion 160 in the image pickup apparatus 100 or the user interface portion 300 in the recording apparatus 200 as shown in FIG. 1 may constitute the device for controlling frame rate. The following will describe a case where the user interface portion 300 in the recording apparatus 200 is utilized as the device for controlling frame rate.

Figure 4:
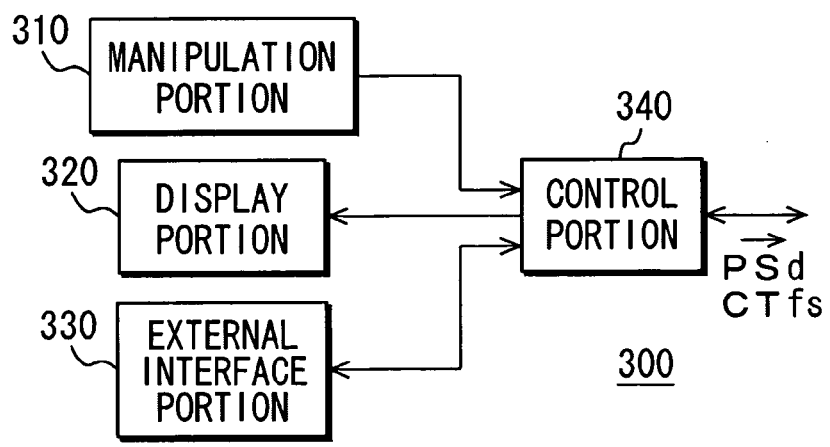
FIG. 4 is a block diagram for illustrating a configuration of a user interface portion used in an embodiment of the recording apparatus.
Figure 5:
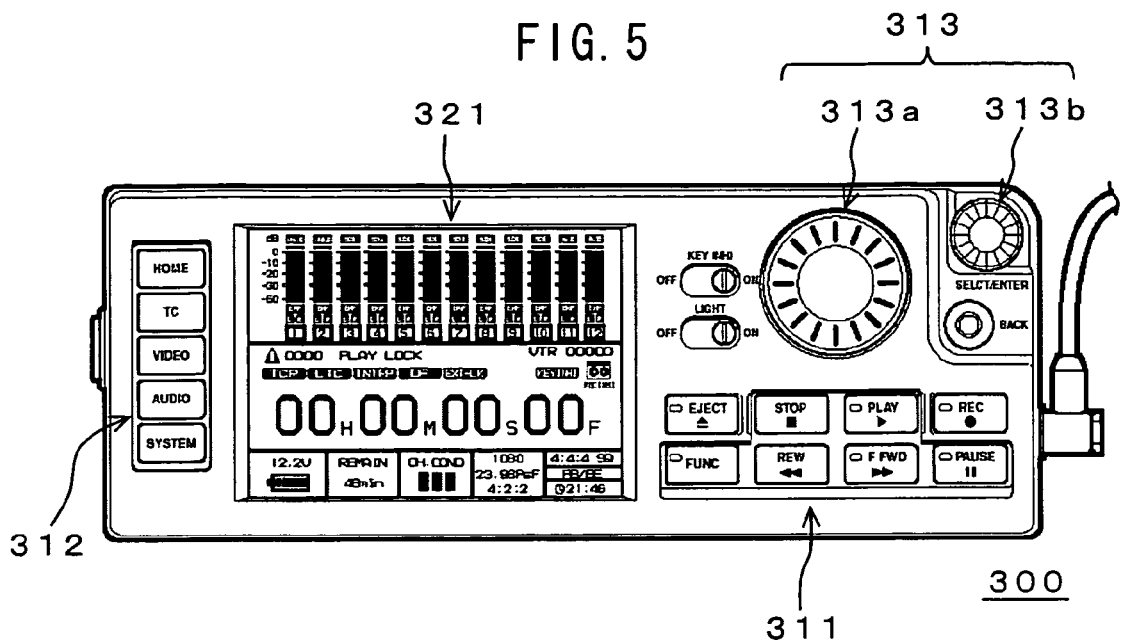
FIG. 5 is a diagram for illustrating an outline of the user interface portion.

FIG. 4 illustrates a configuration of the user interface portion 300. The user interface portion 300 contains a manipulation portion 310, a display portion 320, an external interface portion 330, and a control portion 340. FIG. 5 illustrates an outline of the user interface portion 300.

The manipulation portion 310 contains groups of manipulation keys 311, 312, 313. When the user tries to use the recording apparatus 200 to execute a recording operation or a reproducing operation, he or she manipulates the group of manipulation keys 311. When the user selects one from setting relative to the system, setting relative to the image, and setting relative to the audio if he or she tries to execute various kinds of settings, he or she uses the group of manipulation keys 312. When the user tries to change setting items or reflect its set contents, he or she uses the group of manipulation keys 313 including manipulation keys 313a, 313b.

The display portion 320 is constituted of display elements such as a liquid crystal panel. The display portion 320 displays a menu presentation, presentation of various kinds of setting states, presentation of operating states or the like on its screen 321.

The external interface portion 330 communicates with a memory card and/or an external device(s). The control portion 340 captures any information stored in the memory card and/or generated by the external device(s) through the external interface portion 330, so that various kinds of setting and the like can be realized without any manipulation to the manipulation potion 310.

The control portion 340 detects that a user manipulates any various kinds of keys in the manipulation portion 310. The control portion 340 generates the operation signal PSd based on a result of this detection and supplies it to the record/reproduction-controlling portion 280. The control portion 340 also controls the display portion 320 to change its display contents based on the user's key manipulation. When the user manipulates the manipulation portion 310 to select a desired variation of frame rate change over time from plural variations thereof, the control portion 340 further generates and outputs the frame rate control signal CTfs that is used for changing the frame rate automatically based on the selected variation.

As the frame rate control signal CTfs, for example, a signal indicating a value of the frame rate to be changed is used. In this case, at each of the timings when the frame rates are changed, the control portion 340 generates and outputs the frame rate control signals CTfs that indicate new frame rates successively. If such the frame rate control signal CTfs indicating a value of the frame rate to be changed is used, the image pickup apparatus 100 or the recording apparatus 200 is available only by setting the frame rate to a value of the frame rate indicated by the frame rate control signal CTfs, thereby enabling any processing in the image pickup apparatus 100 or the recording apparatus 200 to be made easy.

As the frame rate control signal CTfs, for example, any information indicating values of the frame rate may be used for every period of elapsed time. In this case, if the frame-rate-changing operation is executed, the control portion 340 generates the frame rate control signal CTfs to supply it to the image pickup apparatus 100 or the recording apparatus 200. The image pickup apparatus 100 or the recording apparatus 200 sets the frame rate to values of the frame rates corresponding to the period of elapsed time based on the information indicated by the frame rate control signal CTfs. If such the information indicating the values of the frame rate to be changed for every period of elapsed time is used, it is not necessary that the control portion 340 generates the frame rate control signal CTfs to supply it to the image pickup apparatus 100 or the recording apparatus 200 during the frame-rate-changing operation. Thus, even if there is a case where periods of delayed time vary when the frame rate control signal CTfs is transmitted, it is possible to control the frame rate variably based on the selected variation of the frame rate. It is to be noted that the signal indicating the value of the frame rate contains a control signal for controlling the frame rate as to become the value of the frame rate in addition to the signal indicating the value of the frame rate.

The following will describe a setting operation when the frame rate is automatically changed and a generation operation of the frame rate control signal CTfs. If the frame rate is automatically changed, for example, the user manipulates the group of manipulation keys 312 in the manipulation portion 310 to display a menu screen on the display portion 320.

Figure 6:
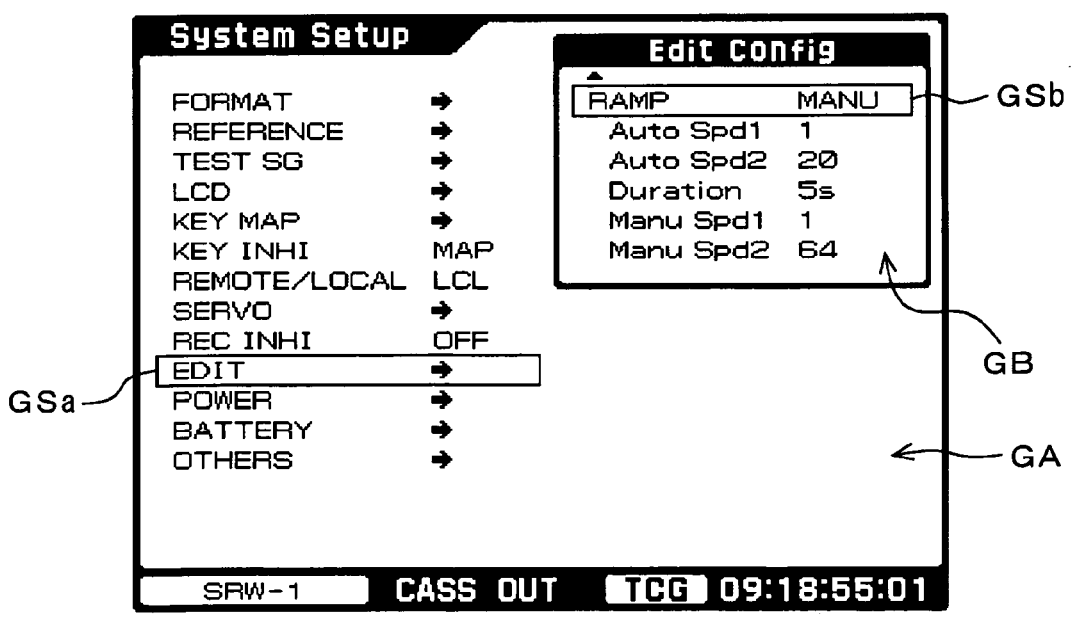
FIG. 6 is a diagram for illustrating a menu screen.

FIG. 6 illustrates the menu screen GA for setting up the system. The menu screen GA contains title presentation of plural setting items. When the manipulation key 313a in the manipulation portion 310 is manipulated, a cursor GSa scrolls up and down based on the user's key manipulation, so that a setting screen relative to the title presentation, which is indicated by the cursor GSa, can appear. For example, as shown in FIG. 6, when the user selects the title presentation, "EDIT" indicated by the cursor GSa, a pop-up setting screen GB for setting a variation of the frame rate change over time is displayed.

The user may set a setting item indicated by a cursor GSb on this setting screen GB. The setting item, "RAMP" relates to a selection of a variation of the frame rate change over time from the plural variations thereof. The setting item, "RAMP" contains various modes such as a "Linear" mode, an "Inverse" mode, an "Even" mode, a "user" mode, and a "Manual" mode.

The "Linear" mode relates to a mode of a linear variation of the frame rate change, in which the frame rate is changed automatically. The "Inverse" mode relates to a mode of a linear variation of frame rate change relative to an inverse of the frame rate, in which the frame rate is changed automatically. The "Even" mode relates to a mode of a variation of frame rate change, in which numbers of frames to be generated or recorded is same for each value of the frame rates and the frame rate is changed automatically. The "User" mode relates to a mode of a variation of frame rate change based on information on the frame rate change, in which the frame rate is changed automatically. The "Manual" mode relates to a mode in which a user can change the frame rate manually within a user's set range thereof.

By manipulating the manipulation key 313a in the manipulation portion 310, the user may change these modes. When the desired mode is selected, by manipulating the manipulation key 313b in the manipulation portion 310, any operations relative to the selected mode are executed. It is to be noted that on other setting items, it is possible that the user manipulates the manipulation key 313a to change the setting contents and then, manipulates the manipulation key 313b to reflect the setting contents.

Figure 7:
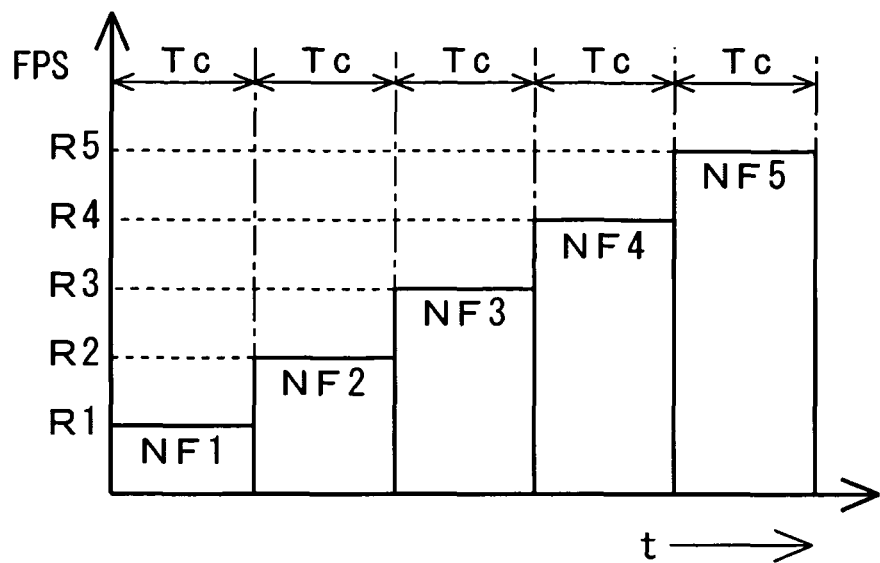
FIG. 7 is a graph for showing an operation of a linear mode.

FIG. 7 shows a case where the frame rate varies in the "Linear" mode so that it can be increased. In this case, the frame rate varies linearly and thus, each period of time Tc for frame rate change is constant. If a frame rate at a start time for frame rated change is R1 and numbers of the frames to be generated or recorded are NF1, the numbers of the frames to be generated or recorded are increased in order of NF2 (2*NF1), NF3 (3*NF1), NF4 (4*NF1), and NF5 (5*NF1) when the frame rate varies from R1 to R5 (=5*R1) through R2 (2*R1), R3 (3*R1), and R4 (4*R1) in this order. Accordingly, if an image signal is recorded in the "Linear" mode with the frame rate being increased, a period of time for reproducing the image recorded with the frame rate being set to increased one is elongated when reproducing the recorded image signal at a predetermined frame rate.

Figure 8:
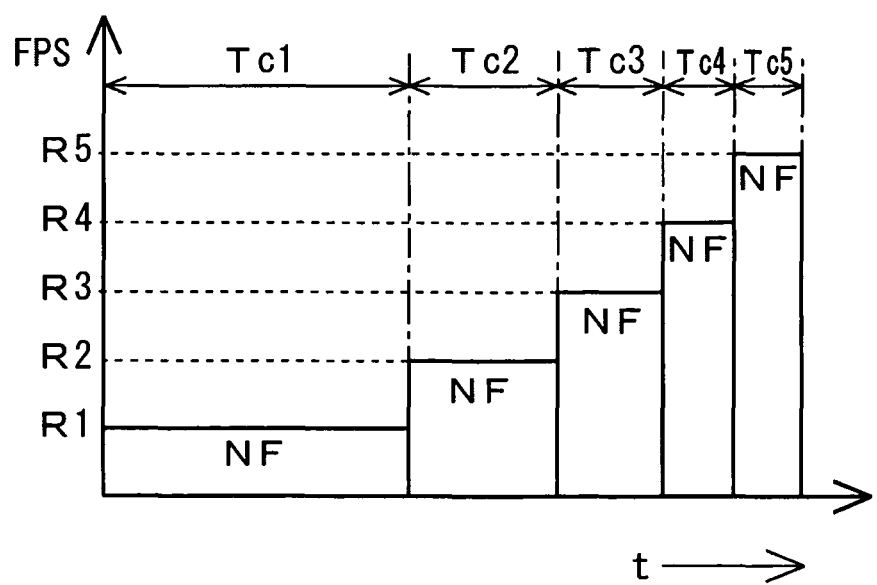
FIG. 8 is a graph for showing an operation of an even mode.

FIG. 8 shows a case where the frame rate varies in the "Even" mode so that it can be increased. In the "Even" mode, the frame rate varies automatically so that the frames to be generated or recorded can be equal to each other in number. Accordingly, if a frame rate at a start time for frame rate change is R1, a period of time for change is Tc1, and numbers of the frames to be generated or recorded are NF, the periods of time for change are decreased in order of Tc2 (½*Tc1), Tc3 (⅓*Tc1), Tc4 (¼*Tc1), and Tc5 (⅕*Tc1) when the frame rate varies from R1 to R5 (=5*R1) through R2 (2*R1), R3 (3*R1), and R4 (4*R1) in this order. Accordingly, if an image signal is recorded in the "Even" mode with the frame rate being increased, a period of time for reproducing the image recorded with the frame rate being set to increased one is not elongated when reproducing the recorded image signal at a predetermined frame rate.

If the frame rate varies so that it can be decreased, which is not shown, a period of time for reproducing the image recorded with the frame rate being set to decreased one is shortened in the "Linear" mode. If a frame rate at a start time for frame rate change is higher, a period of time for reproducing the image recorded with the frame rate being set to increased one is elongated. By accompanying with decreased frame rate, periods of time for reproducing the recorded image with each of the frame rates are decreased sequentially.

In the "Even" mode, a period of time for reproducing the recorded image with the frame rate being set to decreased one is not shortened. Namely, in the "Even" mode, a more smooth transition effect may be obtained as compared with that of the "Linear" mode.

When any one of the "Linear" mode, the "Inverse" mode, and the "Even" mode is selected, the control portion 340 controls the display portion 320 to enables the user to set the setting items, "Auto Spd1", "Auto Spd2", and "Duration" on the setting screen GB shown in FIG. 6. The setting items, "Auto Spd1", "Auto Spd2" are respectively used for setting frame rate at the start time for frame rate change and frame rate at the finished time for the frame rate change. The setting item, "Duration" is used for setting a period of time which may be required for changing the frame rate automatically from the frame rate set by the setting item, "Auto Spd1" to the frame rate set by the setting item, "Auto Spd2" or from the frame rate set by the setting item, "Auto Spd2" to the frame rate set by the setting item, "Auto Spd1".

Figure 9:
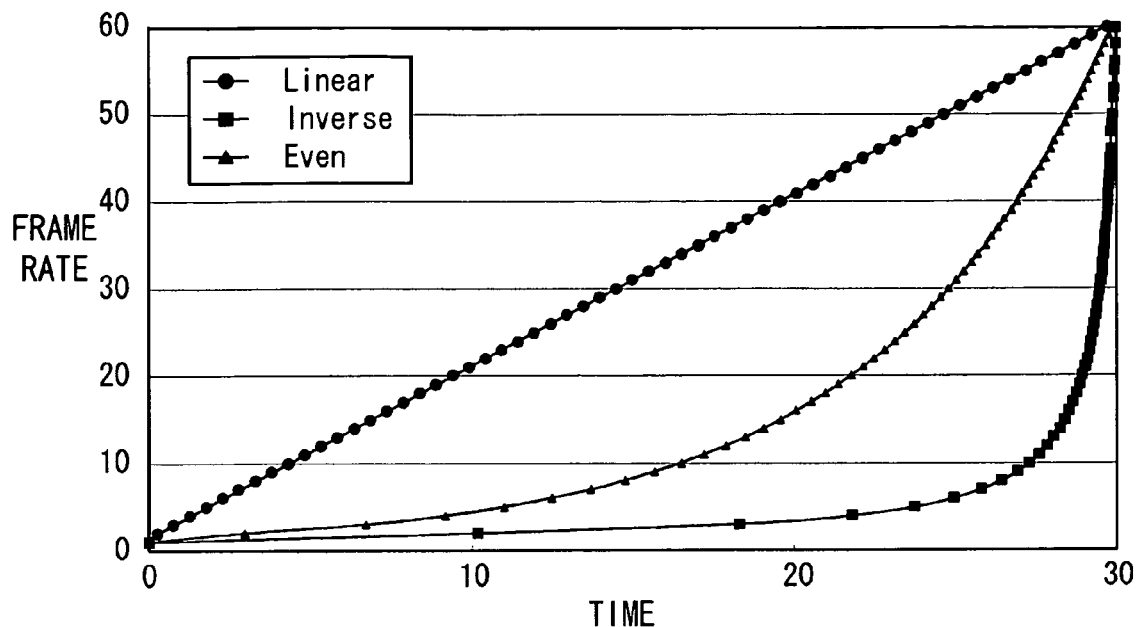
FIG. 9 is a graph for showing variations of frame rates over time.

FIG. 9 shows variations of frame rate change over time when the setting items, "Auto Spd1" and "Auto Spd2" are 1 FPS (frames/second) and 60 FPS, respectively, and the setting item, "Duration" is 30 seconds.

In FIG. 9, a variation of the frame rate change indicated by black dotted marks indicates the variation of the "Linear" mode, in which the frame rate varies linearly and automatically. A variation of the frame rate change indicated by black rectangular marks indicates the variation of the "Inverse" mode, in which an inverse of the frame rate varies linearly and automatically. A variation of the frame rate indicated by black triangular marks indicates the variation of the "Even" mode, in which the frame rate varies automatically so that numbers of frames to be generated or recorded can be constant at frame rates.

When the user selects the "User" mode, the control portion 340 controls the display portion 320 to enable the user 5 to set a setting item, "Load Curve". The setting item, "Load Curve" is used for capturing information on the frame rate change. On the capture of the information on the frame rate change, for example, the control portion 340 controls the external interface portion 330 to capture the information on the frame rate change stored in a memory card or generated by an external device through the external interface portion 330.

Figure 10:
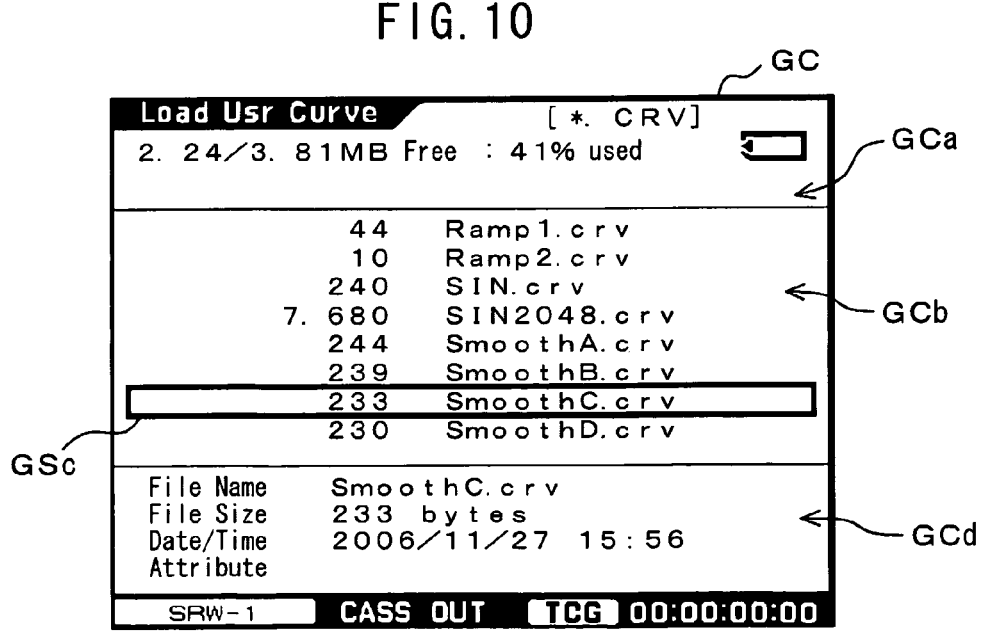
FIG. 10 is a diagram for showing an example of a screen displaying a list of pieces of information on frame rate changes.

If there are pieces of the information on the frame rate change, the control portion 340 controls the display portion 320 to display a screen GC for indicating a list of the pieces of the information on the frame rate change, as shown in FIG. 10. When the user selects any item of the pieces of the listed information on the frame rate change, the control portion 340 controls the display portion 320 to display a screen GD for indicating a variation of frame rate change based on the selected information on the frame rate change, as shown in FIG. 11.

In the screen GC for indicating a list of the pieces of the information on the frame rate change shown in FIG. 10, information on a recording medium in which the pieces of the information on the frame rate change are stored is displayed on a display region GCa. Titles of the pieces of the information on the frame rate change and their amounts of items of stored data are displayed on a display region GCb. Attribution information of a piece of the information on the frame rate change, which the user has selected by using a cursor GSc, is displayed on a display region GCd.

Figure 11:
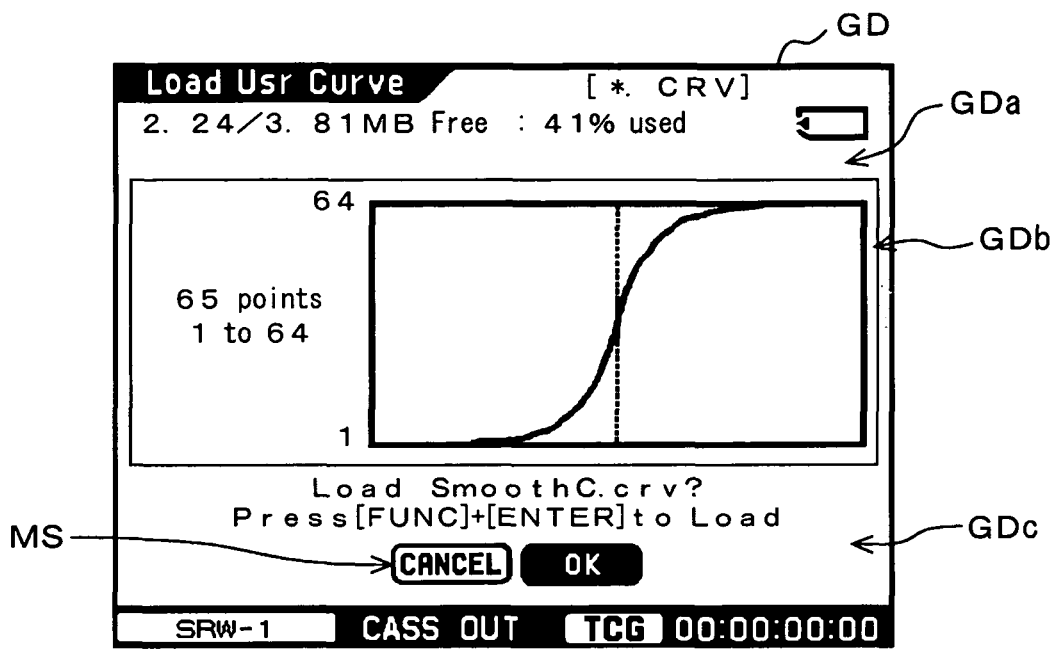
FIG. 11 is a diagram for showing an example of a screen displaying a variation curve based on the information on frame rate changes.

In the screen GD for indicating a variation of frame rate change shown in FIG. 11, information on a recording medium in which the pieces of the information on the frame rate change are stored is displayed on a display region GDa. The variation of the frame rate change based on the piece of the information on the frame rate change, which the user has selected by using the cursor GSc, is displayed on a display region GDb. A user selection menu MS for allowing the user to choose whether the image pickup apparatus 100 or the recording apparatus 200 captures the information on the frame rate change is provided on a display region GDc. When the user selects an OK button to capture the user selection menu MS, the control portion 340 captures the information on the frame rate change relative to the displayed variation of the frame rate change and controls the frame rate change based on the captured information on the frame rate change.

Thus, it is possible to capture the information on the frame rate change relative to the desired variation of frame rate change easily by displaying the list of the pieces of the information on the frame rate change and displaying the variation of the frame rate change based on the piece of the selected information on the frame rate change, thereby enabling the frame rate change to be controlled.

Figures 12A, 12B:
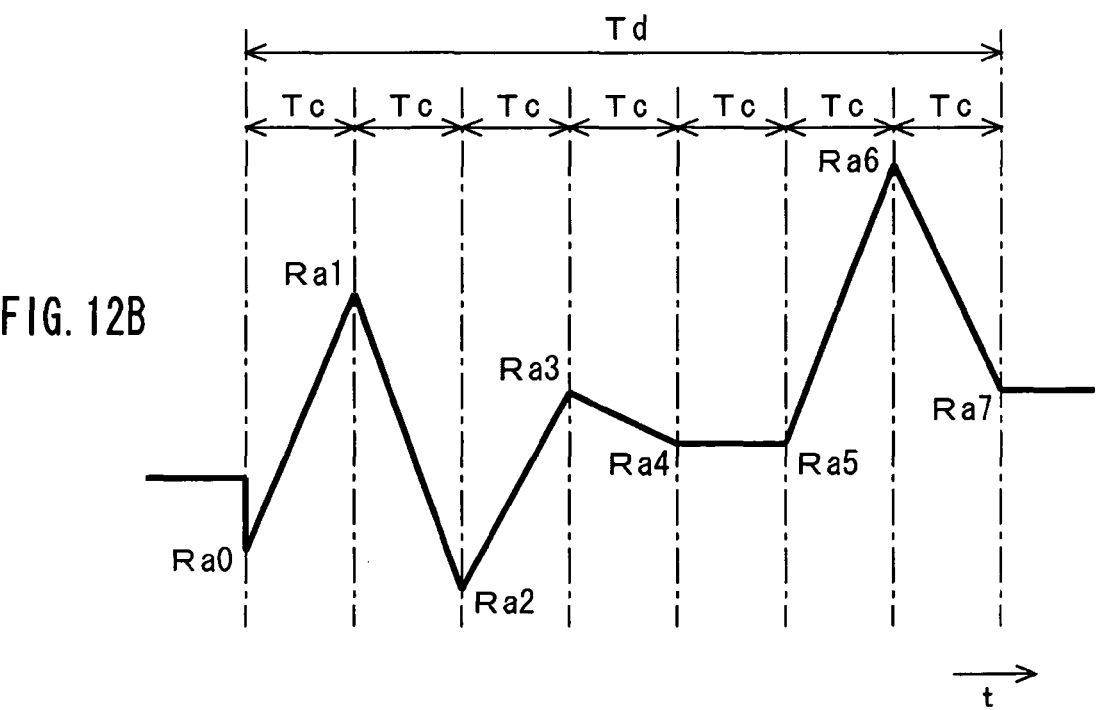
FIG. 12A is a diagram for showing an example of pieces of the information on frame rate change and FIG. 12B is a graph for showing a variation of the frame rate relative to the information on frame rate changes.

The following will describe the information on the frame rate change. The information on the frame rate change contains a series of transit points in the variation of the frame rate change. FIG. 12A shows an example of the pieces of the information on frame rate change. A series of eight transit points, Ra0, Ra1, Ran, in the variation of the frame rate change is illustrated in order. FIG. 12B shows the variation of the frame rate change when the frame rate change is performed by using the information on frame rate change shown in FIG. 12A. It is to be noted that a period of time Tc for frame rate change or a period of whole time Td for the variation of the frame rate change may be indicated by the information on frame rate change or set previously by the control portion 340.

When the "Manual" mode is selected on the setting item, "RAMP" in the setting screen GB shown in FIG. 6, the control portion 340 controls the display portion 320 to enables the user to set the setting items, "Manu Spd1" and "Manu Spd2". The setting items, "Manu Spd1" and "Manu Spd2" are respectively used for setting a maximum and a minimum of the frame rate.

Figure 13:
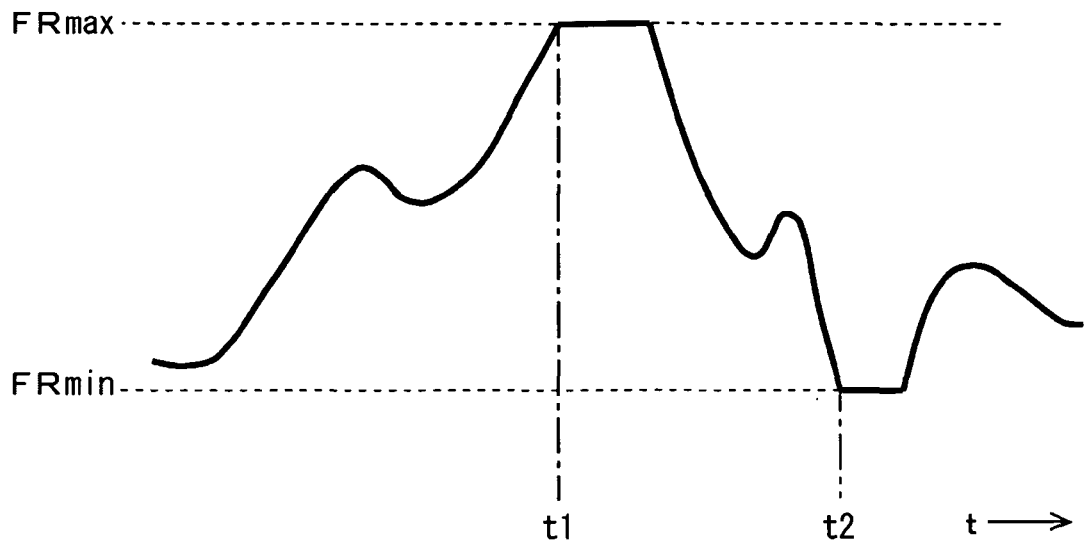
FIG. 13 is an illustration for showing a variation of frame rate when a user selects a manual mode.

FIG. 13 shows a variation of the frame rate change when the user selects the "Manual" mode. When the user selects the "Manual" mode, the control portion 340 changes the frame rate based on the user's manipulation of the manipulation key 313a. In the "Manual" mode, the control portion 340 limits the variation of the frame rate change to a range indicated by the setting items, "Manu Spd1" and "Manu Spd2". For example, when the user manipulates the manipulation key to increase the frame rate to reach the frame rate, "FRmax" set by the setting item, "Manu Spd2" at time t1, the control portion 340 limits the frame rate to the frame rate, "FRmax", even if the user further manipulates the manipulation key to increase the frame rate. When the user manipulates the manipulation key to decrease the frame rate to reach the frame rate, "FRmin" set by the setting item, "Manu Spd1" at time t2, the control portion 340 limits the frame rate to the frame rate, "FRmin", even if the user further manipulates the manipulation key to decrease the frame rate.

Figure 14:
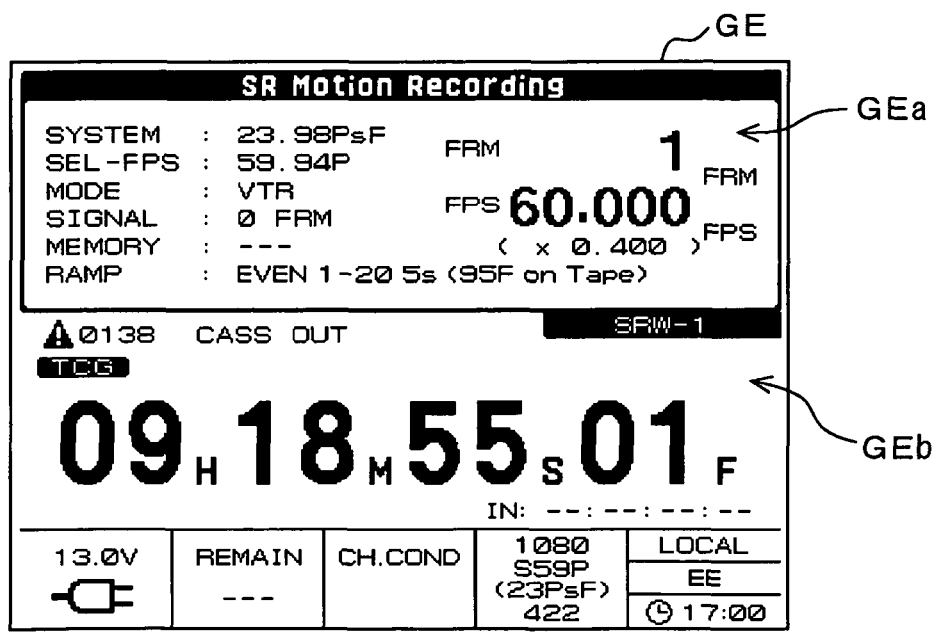
FIG. 14 is a diagram for showing an example of a display screen when frame rate variation control is executed.

FIG. 14 shows an example of a display screen GE displayed on the display portion 320 when frame rate change control is executed.

In the display screen GE, setting state or operation state relative to the frame rate change control is displayed on a display region GEa. Information on operations of the recording apparatus 200 and the like is displayed on a display region GEb. When the mode selected in the setting item, "RAMP" is displayed on the display region GEa and the user selects any one from the "Linear" mode, the "Inverse" mode, and the "Even" mode therein, the control portion 340 controls the display portion 320 to display setting states of the setting items, "Auto Spd1", "Auto Spd2", and "Duration". It is to be noted that FIG. 14 shows an example in which the "Even" mode is selected and the setting items, "Auto Spd1", "Auto Spd2", and "Duration" are respectively, set to "1 P", "20 P", and "20 seconds", wherein "P" indicates "progress".

When the user selects the "User" mode while the setting item, "RAMP" is displayed, the control portion 340 controls the display portion 320 to display information that is capable for distinguishing the information on the frame rate change, for example, titles of the information on the frame rate change, from the display on the setting states of the setting items, "Auto Spd1", "Auto Spd2", and "Duration". When the user selects the "Manual" mode while the setting item, "RAMP" is displayed, the control portion 340 controls the display portion 320 to display setting states of the setting items, "Manu Spd1", "Manu Spd2", from the display on the setting states of the setting items, "Auto Spd1", "Auto Spd2", and "Duration".

While the frame rate change control is executed, it is possible that the frame rate change control stops based on any user's manipulation to the key on the manipulation portion 310. It is also possible that the frame rate change control is executed so that the frame rates at a starting time and a finishing time of the frame rate change control are exchanged to each other to reverse the orders in the variation of the frame rate change along the time direction thereof.

If a system is employed in which displayed color varies according to any mode selected in the setting item, "RAMP", the user can know its operation state easily. If a system is employed in which displayed color varies according to whether or not the frame rate change control is executed, the user can know its operation state easily. On the display screen GE, a current frame rate is displayed in FPS units and the number of frames accumulated from the starting time of the frame rate change control is also displayed in FRM units.

The following will describe operations of the image pickup apparatus 100. When receiving the frame rate control signal CTfs, the image-pickup-controlling portion 150 in the image pickup apparatus 100 generates the image pickup control signal CTa for bring the output image signal DVb to the signal having a frame rate (hereinafter referred to as "indicated frame rate FRs") based on the frame rate control signal CTfs, thereby controlling operations of the image pickup unit 111 and the frame-addition-processing portion 120.

The frame-addition-processing portion 120 adjusts numbers of frames FA to be added up so that an image-pickup frame rate FRp that is a frame rate of the image pickup signal Spa generated by the image pickup unit 111 can stay within a predetermined range even if the indicated frame rate FRs of the generated image signal is low when the image signal of the indicated frame rate FRs indicated by the frame rate control signal CTfs is generated.

FIG. 15 shows a relationship among the indicated frame rates FRs, the numbers of frame(s) FA to be added up, and the image-pickup frame rates FRp. The image-pickup-controlling ID portion 150 sets the numbers of frame(s) FA to be added up to "1" when the indicated frame rate FRs stays within a range of 60 P≧FRs>30 P, thereby enabling the image-pickup frame rate FRp to be equal to the indicated frame rate FRs.

The image-pickup-controlling portion 150 also sets the numbers of frame(s) FA to be added up to "2" when the indicated frame rate FRs stays within a range of 30 P≧FRs>20 P, thereby enabling the image-pickup frame rate FRp to become twice as much as the indicated frame rate FRs.

The image-pickup-controlling portion 150 also sets the numbers of frame(s) FA to be added up to "3" when the indicated frame rate FRs stays within a range of 20 P≧FRs>15 P, thereby enabling the image-pickup frame rate FRp to become three times as much as the indicated frame rate FRS. This also applies to the following cases. Thus, by adjusting the image-pickup frame rate FRp and the numbers of frame(s) FA to be added up, it is possible to change the indicated frame rate FRs without a break, thereby enabling the image signal having the indicated frame rate FRS indicated by the frame rate control signal CTfs to be generated.

It is to be noted that if the image-pickup frame rate FRp that is a frame rate of the image pickup signal Spa is changed, a period of time for accumulation of charges in the image pickup device, read-out timing of the imaged charges and the like may be controlled by using the driving control signal RC which the image pickup unit 111 receives from the driving unit 112, so that the image pickup signal Spa having a changed frame rate can be obtained.

If the image-pickup frame rate FRp varies using a common data rate (CDR) system (common sampling frequency system) by adjusting a period of a horizontal blanking interval or a vertical blanking interval, it is possible to generate such an image signal Spa that an image size during a valid screen period may not change even if the image-pickup frame rate FRp varies. By using the CDR system, there is no need to change operating frequencies of various parts using the image-pickup frame rate FRp based on the image-pickup frame rate FRp, thereby causing a configuration of each part to be made simple.

According to this CDR system, by adjusting duration of a horizontal blanking interval as shown in FIG. 16B or that of a vertical blanking interval as shown in FIG. 16C for an image signal whose blanking interval and valid screen period have been set as shown in FIG. 16A, it is possible to generate an image signal having a varied image-pickup frame rate FRp without changing the image size during the valid screen period.

If the frame rate is previously set when a communication relative to an image signal is carried out through the transmission path 400, an image signal having the indicated frame rate FRs indicated by the frame rate control signal CTfs is transmitted as a signal having the set frame rate. For example, such the signal having the set frame rate is generated by repeating the frame image or inserting frame(s) relative to blank image and transmitted as a signal having the set frame rate. In this moment, a flag indicating whether or not this is the repeated frame or the frame relative to blank image is set to each frame, in order to distinguish whether or not this is the repeated frame or the frame relative to blank image.

FIG. 17 shows operations in the case of generating the image signal DVb and the communication information RMp wherein the indicated frame rate FRs indicated by the frame rate control signal CTfs is, for example, set to "18 P" and the frame rate of the image signal that is transmitted through the transmission path 400 is set to "60 P". It is to be noted that the frames are added by using, for example, three RAMs, RAM-1 through RAM-3.

FIG. 17A shows the image signal DVa, FIG. 17B shows an operation of RAM-1, FIG. 17C shows that of RAM-2, FIG. 17D shows that of RAM-3, FIG. 17E shows an externally readable flag LG, FIG. 17F shows the image signal DVb, and FIG. 17G shows the communication information RMp.

If the indicated frame rate FRs is "18", the numbers of frame(s) FA to be added up is "3", so that the image-pickup frame rate FRp becomes "54 P" that are three times as much as the indicated frame rate FRs, based on FIG. 15, thereby enabling the image signal DVa to have a frame rate of "54 P".

At a point of time t11 of FIGS. 17A through 17G when frame "0f" of the image signal DVa starts, the RAM-1 is specified as a write RAM that stores the image signal DVa of the frame "0f".

Then, when frame "1f" of the image signal DVa starts at a point of time t12, RAM-2 is specified as a write RAM. The RAM-2 stores an added signal in which the image signal of the frame "1f" and the image signal of the frame "0f" that is read out of RAM-1.

When frame "2f" of the image signal DVa starts at a point of time t13, RAM-3 is specified as a write RAM. The RAM-3 stores an added signal in which the image signal of the frame "2f" and the image signal of the frames "0f+1f" that is read out of RAM-2.

When frame "3f" of the image signal DVa starts at a point of time t14, the externally readable flag LG is set ON, as shown in FIG. 17E, because the write of the addition signal for frames to be added up into RAM-3 has been completed. In this moment, RAM-3 is also specified as an externally readable RAM. RAM-1 is then specified as a write RAM that stores the image signal of the frame "3f".

Next, in a case where a timing comes to start a frame of the image signal DVb when the write of the addition signal for frames to be added up into RAM-3 has been completed, namely, the externally readable flag LG is set ON, for example, in a case where a timing comes to start a frame of the image signal DVb at a point of time t15 when the write of the addition signal to which the image signal of frames "0f" through "2f" has been added into RAM-3 has been completed, the addition signal of three frames that is stored in RAM-3 is read out and multiplied by "⅓", thereby setting it as the image signal DVb. Furthermore, as shown in FIG. 17G, the image signal DVb is associated with the communication information RMp in order to determine that the image signal DVb is an image signal having the frame rate based on the frame rate control signal CTfs, so that a frame of the image signal DVb at this time is brought into "valid" state. Further, frame(s) of the image signal DVb in which the externally readable flag LG is not set ON and the addition signal has not yet been read out of RAM, for example, frames following a point of time t16, is (are) brought into "invalid" state.

Similarly, by using RAM-1 through RAM-3 to generate the addition signal by adding up three frames of the image signal DVa and read the addition signal at a timing to start a frame of the image signal DVb, it is possible to generate the image signal DVb having a predetermined fame rate in which a shot image is contained at a frame rate indicated by the frame rate control signal CTfs.

Next, at a point of time t16 when a frame in which the signal has been read out of the RAM-3 ends, the externally readable flag LG is set OFF. It is to be noted that if a period in which no signal is read out of the external read RAM, for example, a period from a point of time t16 to a point of time t17 is used as a blank frame without image, brightness of an image may flicker when the image is displayed on the basis of the image signal DVb. Therefore, in a period of time relative to "invalid" frame, an image of "valid" frames "(0f+1f+2f/3)" can be displayed repeatedly to prevent flickering of the brightness.

The following will describe operations of the recording apparatus 200. The record/reproduction-controlling portion 280 of the recording apparatus 200 generates the record/reproduction control signal CTd based on the frame rate control signal CTfs and supplies it to the record-signal-generating generating portion 220. The record-signal-generating portion 220 performs thinning-out of frame(s), repeat of frame(s), interpolation of frames using motion vector or the like on the image signal DVb used for generating the record signal WS based on the record/reproduction control signal CTd to generate the record signal WS having the frame rate indicated by the frame rate control signal CTfs and supply the record signal WS to the buffer memory 230. The buffer memory 230 stores the record signal WS. The recording/reproducing portion 240 reads the record signal WS out of the buffer memory 230 and records the record signal WS on a recording medium one after another, thereby enabling the image signal having a frame rate indicated by the frame rate control signal CTfs to be recorded. If the recording apparatus 200 receives the image signal DVb having a predetermined fame rate in which a shot image is contained at a frame rate indicated by the frame rate control signal CTfs, the record-signal-generating portion 220 extracts the image signal relative to the "valid" frame(s) according to the communication information RMp and generates the record signal WS by using the extracted image signal to supply it the buffer memory 230. The record/reproduction-controlling portion 280 controls the buffer memory 230 to store the record signal WS generated based on the image signal relative to the "valid" frame(s) according to the communication information RMp. The recording/reproducing portion 240 then reads the record signal WS out of the buffer memory 230 and records the record signal WS on a recording medium. This enables the image signal having a frame rate indicated by the frame rate control signal CTfs to be recorded.

Further, if the recording apparatus 200 receives an image signal having a constant frame rate, the record-signal-generating portion 220 performs thinning-out of frame(s), addition of frame(s) or the like on the received image signal so that an image signal have a frame rate based on the frame rate control signal CTfs can be recorded.

FIGS. 18A through 18C show a case of recording an image signal having a frame rate based on the frame rate control signal CTfs by performing the thinning-out of frames on the image signal DVb. It is to be noted that the image signal DVb has a constant frame rate.

As shown in FIG. 18A, if the image signal DVb has the frame rate of, for example, "60 P" and the indicated frame rate FRs based on the frame rate control signal CTfs is, for example, "20 P", the frame rate of the image signal DVb is three times as much as the indicated frame rate FRs based on the frame rate control signal CTfs. Therefore, as shown in FIG. 18B, if one frame of the image signal Dvb is used, following two frames are thinned out. Such the thinning-out enables the record signal WS relative to an image signal having a frame rate of "20 P" to be recorded as shown in FIG. 18C. It is to be noted that if numbers of the frames to be thinned out vary linearly, the variation of frame rate change in this case equals that of a case where inverse of the frame rate varies linearly and automatically. This is the variation of the frame rate of the above-mentioned "Inverse" mode.

Thus, by providing not only the "Linear" mode but also the "Inverse" mode and the "Even" mode, it is possible to change the frame rate automatically with various kinds of variations. Further, by providing the "User" mode, it is possible for the user to set the variation of the frame rate change at will, so that any change operations of the frame rate can be realized with various variations and a higher degree of freedom.

It should be understood by those skilled in the art that various modifications, combinations, sub-combinations and alternations may occur depending on design requirements and other factors insofar as they are within the scope of the appended claims or the equivalents thereof.

What is claimed is:

1. A device for controlling frame rate of an image signal on a motion image, the device comprising:
   a manipulation portion that a user manipulates to select a desired variation of the frame rate change over time from plural variations thereof; and
   a control portion that controls generation of a frame rate control signal for bringing the frame rate automatically to the variation of the frame rate change selected by the manipulation portion,
   wherein the plural variations include a variation of an inverse mode in which an inverse of the frame rate varies automatically and linearly over time, the variation of the inverse mode being equal to a variation of the frame rate change when numbers of frames to be thinned out increase linearly, and
   wherein the plural variations include a variation of an even mode in which the frame rate is constant during a period of time and increases according to a predetermined ratio after the period of time has elapsed, and the period of time for keeping each constant frame rate decreases according to an inverse of the predetermined ratio, so that numbers of generated or recorded frames during each period of time for keeping each constant frame rate are the same.

2. The device according to claim 1, wherein the plural variations include a variation in which a number of frame is constant in each value of the frame rate when the frame rate varies with a period of time being elapsed.

3. The device according to claim 1, wherein the plural variations include a variation in which the frame rate varies based on information on frame rate change.

4. The device according to claim 3, wherein the information on frame rate change contains information on transit point in the variation of the frame range change when the frame rate varies; and
   wherein the control portion controls generation of the frame rate control signal for changing the frame rate automatically to the frame rate at the transit point indicated by the information on the frame rate change when the variation on the frame rate change is selected on the basis of the information on frame rate change.

5. A method for controlling frame rate of an image signal on a motion image, the method comprising the steps of:
   selecting a desired variation of the frame rate change over time from plural variations thereof based on a user's manipulation; and
   generating a frame rate control signal for bringing the frame rate automatically to the selected variation of the frame rate change,
   wherein the plural variations include a variation of an inverse mode in which an inverse of the frame rate varies automatically and linearly over time, the variation of the inverse mode being equal to a variation of the frame rate change when numbers of frames to be thinned out increase linearly, and
   wherein the plural variations include a variation of an even mode in which the frame rate is constant during a period of time and increases according to a predetermined ratio after the period of time has elapsed, and the period of time for keeping each constant frame rate decreases according to an inverse of the predetermined ratio, so that numbers of generated or recorded frames during each period of time for keeping each constant frame rate are the same.

6. A recording apparatus comprising:
   a record-processing portion that records an image signal on an motion image on a recording medium;
   a manipulation portion that a user manipulates to select a desired variation of the frame rate change over time from plural variations thereof;
   a control portion that controls generation of a frame rate control signal for bringing the frame rate automatically to the variation of the frame rate change selected by the manipulation portion; and
   a record-managing portion that manages the record-processing portion based on the frame rate control signal to enable the record-processing portion to record the image signal on the motion image on the recording medium by changing the frame rate of the image signal on the motion image to the variation of the frame rate change selected by the manipulation portion,
   wherein the plural variations include a variation of an inverse mode in which an inverse of the frame rate varies automatically and linearly over time, the variation of the inverse mode being equal to a variation of the frame rate change when numbers of frames to be thinned out increase linearly, and
   wherein the plural variations include a variation of an even mode in which the frame rate is constant during a period of time and increases according to a predetermined ration after the period of time has elapsed, and the period of time keeping each constant frame rate decreases according to an inverse of the predeterminded ratio, so that numbers of generated or recorded frames during, each period of time for keeping each constant frame rate are the same.

7. An image pickup apparatus comprising:
   an image pickup portion that generates an image pickup signal;
   a frame-addition portion that adds up the image pickup signal in frame units to generate an image signal;
   a manipulation portion that a user manipulates to select a desired variation of the frame rate change over time from plural variations thereof;
   a control portion that controls generation of a frame rate control signal for bringing the frame rate automatically to the variation the frame rate change selected by the manipulation portion; and
   an in age-pickup-managing portion that manages any one of the frame rate of the image pickup signal generated by the image pickup portion and a number of frame that is added up in the frame-addition portion, based on the frame rate control signal, to bring a frame rate of the image signal to the variation on frame rate change selected by the manipulation portion,
   wherein the plural variations include a variation of an inverse mode in which an inverse of the frame rate varies automatically and linearly over time, the variation of the inverse mode being equal to a variation of the frame rate change when numbers of frames to the thinned out increase linearly, and
   wherein the plural variations include a variation of an even mode in which the frame rate is constant during a period of time and increases according to a predetermined ratio after the period of time has elapsed, and the period of time for keeping each constant frame rate decreases according to an inverse of the predeterminded ratio, so that numbers of generated or recorded frames during each period of time for keeping each constant frame rate are the same.

* * * * *